(12) United States Patent
Yun et al.

(10) Patent No.: US 9,263,776 B2
(45) Date of Patent: Feb. 16, 2016

(54) BATTERY SYSTEM AND ENERGY STORAGE SYSTEM INCLUDING THE SAME

(75) Inventors: Han-Seok Yun, Yongin-si (KR); Tetsuya Okada, Yongin-si (KR); Jong-Woon Yang, Yongin-si (KR); Eui-Jeong Hwang, Yongin-si (KR)

(73) Assignee: Samsung SDI Co., Ltd., Gyeonggi-Do (KR)

( * ) Notice: Subject to any disclaimer, the term of this patent is extended or adjusted under 35 U.S.C. 154(b) by 940 days.

(21) Appl. No.: 13/243,234

(22) Filed: Sep. 23, 2011

(65) Prior Publication Data

US 2012/0179399 A1 Jul. 12, 2012

Related U.S. Application Data

(60) Provisional application No. 61/430,484, filed on Jan. 6, 2011.

(51) Int. Cl.
*H02J 7/00* (2006.01)
*H01M 10/44* (2006.01)
(Continued)

(52) U.S. Cl.
CPC .......... *H01M 10/441* (2013.01); *H01M 10/482* (2013.01); *H01M 2010/4271* (2013.01); *H02J 7/0021* (2013.01); *Y02T 10/7055* (2013.01)

(58) Field of Classification Search
CPC ..... H02J 7/0013; H02J 7/0014; H02J 7/0021; H02J 7/0026; H02J 7/0029; H02J 2007/0037; H02J 2007/0039; H02J 2007/004
USPC .................................................. 320/116, 118
See application file for complete search history.

(56) References Cited

U.S. PATENT DOCUMENTS 5,504,415 A * 4/1996 Podrazhansky et al. ...... 320/118
7,091,695 B2 8/2006 Miyazaki et al.
(Continued)

FOREIGN PATENT DOCUMENTS

CN 101399453 A 4/2009
EP 2 204 874 A2 7/2010
(Continued)

OTHER PUBLICATIONS

Korean Registration Determination Certificate dated Jan. 10, 2013 for Korean Patent Application No. KR 10-2011-0137407 which claims priority from U.S. Appl. No. 61/430,484, filed Jan. 6, 2011, and captioned U.S. Appl. No. 13/243,234.
(Continued)

*Primary Examiner* — Richard Isla Rodas
*Assistant Examiner* — Michael Dibenedetto
(74) *Attorney, Agent, or Firm* — Knobbe, Martens, Olson & Bear, LLP

(57) ABSTRACT

A battery system having components with reduced maximum voltage tolerance requirements is disclosed. The battery system includes a battery pack with battery modules, and measuring units, which are connected to the battery modules. The measuring units have first analog front ends (AFEs) for monitoring the at least two battery modules. Each first AFE is configured to transmit information related to the monitored characteristic via an isolator to a processor configured to control the battery pack based on the transmitted information. The isolator receives the transmitted information from an AFE which is not connected to the battery module having the least electric potential or to the battery module having the greatest electric potential.

19 Claims, 9 Drawing Sheets

(51) Int. Cl.
*H01M 10/48* (2006.01)
*H01M 10/42* (2006.01)

(56) References Cited

U.S. PATENT DOCUMENTS

| | | | |
|---|---|---|---|
| 7,471,065 | B2 | 12/2008 | Emori et al. |
| 7,511,457 | B2 * | 3/2009 | Emori .................. B60L 3/0046 320/116 |
| 7,551,457 | B2 * | 6/2009 | Karstens ....................... 361/801 |
| 8,022,669 | B2 * | 9/2011 | Li ......................... H02J 7/0021 320/122 |
| 2001/0026161 | A1 | 10/2001 | Furukawa |
| 2005/0242667 | A1 | 11/2005 | Emori et al. |
| 2005/0242776 | A1 | 11/2005 | Emori et al. |
| 2009/0169987 | A1 | 7/2009 | Miyazaki et al. |
| 2010/0173180 | A1 | 7/2010 | Li |
| 2011/0140662 | A1 * | 6/2011 | Li ......................... H02J 7/0016 320/116 |
| 2011/0296218 | A1 * | 12/2011 | Kim et al. ..................... 713/323 |

FOREIGN PATENT DOCUMENTS

| | | |
|---|---|---|
| GB | 2 453 207 A | 4/2009 |
| GB | 2 463 145 A | 3/2010 |
| JP | 7-85891 (A) | 3/1995 |
| JP | 9-139237 (A) | 5/1997 |
| JP | 2001-289886 A | 10/2001 |
| JP | 2002-110259 (A) | 4/2002 |
| JP | 2003-009403 (A) | 1/2003 |
| JP | 2008-118855 A | 5/2008 |
| JP | 2008-295299 A | 12/2008 |
| JP | 2009-100644 A | 5/2009 |
| JP | 2010-003536 A | 1/2010 |
| JP | 2010-063259 A | 3/2010 |
| JP | 2010-63259 A | 3/2010 |
| KR | 10-2007-0105220 A | 10/2007 |

OTHER PUBLICATIONS

Chinese Office Action dated Dec. 31, 2014 for Chinese Patent Application No. CN201210003068.6 which claims priority from U.S. Appl. No. 61/430,484, filed Jan. 6, 2011, and captioned U.S. Appl. No. 13/243,234, and cites the above-identified Category A references (not considered to be of particular relevance) No. 1-4.

Extended European Search Report dated May 13, 2015 for European Patent Application No. EP 11 194 678.6 which shares priority of U.S. Appl. No. 61/430,484, filed Jan. 6, 2011, with captioned U.S. Appl. No. 13/243,234, and cites the above-identified references No. 1-3.

Japanese Office Action dated Aug. 25, 2015 for Japanese Patent Application No. JP 2011-285988 which shares priority of U.S. Appl. No. 61/430,484, filed Jan. 6, 2011, with captioned U.S. Appl. No. 13/243,234, and cites the above-identified references numbered 1-4.

* cited by examiner

BATTERY SYSTEM AND ENERGY STORAGE SYSTEM INCLUDING THE SAME

CROSS REFERENCE TO RELATED APPLICATIONS

This application claims priority to U.S. Provisional No. 61/430,484, titled "BATTERY SYSTEM AND ENERGY STORAGE SYSTEM INCLUDING THE SAME," filed Jan. 6, 2011, which is hereby incorporated by reference in its entirety.

BACKGROUND

1. Field

The disclosed technology relates to a battery system and an energy storage system including the battery system.

2. Description of the Related Technology

Recently, batteries have become widely used in various fields, including portable devices, such as mobile phones and notebook computers, and large products, such as electric cars and energy storage systems. A battery and a control circuit for controlling the charging and discharging of the battery are generally included in a single system, and effective and efficient power control and management of the system becomes important. In particular, large battery systems are especially problematic because of the large voltages these systems may require the control circuitry to withstand.

SUMMARY OF CERTAIN INVENTIVE ASPECTS

One inventive aspect is a battery system, including a battery pack with a plurality of battery modules, where each battery module includes at least one battery cell. The battery system also includes a plurality of measuring units, where each measuring unit is connected to at least two of the battery modules, and each measuring unit includes at least two first analog front ends (AFEs) configured to monitor at least one characteristic of the at least two battery modules. Each first AFE is configured to transmit information related to the monitored characteristic via an isolator to a processor configured to control the battery pack based on the transmitted information. The isolator is configured to receive the transmitted information from an AFE which is not connected to the battery module of the battery modules having the least electric potential or to the battery module of the battery modules having the greatest electric potential.

Another inventive aspect is an energy storage system, including a power conversion system configured to be connected to a power source and to a load, a battery management system connected to the power conversion system, and a battery system connected to the battery management system. The battery system includes a battery pack with a plurality of battery modules, where each battery module includes at least one battery cell. The battery system also includes a plurality of measuring units, where each measuring unit is connected to at least two of the battery modules, and each measuring unit includes at least two first analog front end (AFE)s configured to monitor at least one characteristic of the at least two battery modules. Each first AFE is configured to transmit information related to the monitored characteristic via an isolator to a processor configured to control the battery pack based on the transmitted information. The isolator is configured to receive the transmitted information from an AFE which is not connected to the battery module of the battery modules having the least electric potential or to the battery module of the battery modules having the greatest electric potential among the battery modules.

DETAILED DESCRIPTION OF CERTAIN INVENTIVE EMBODIMENTS

Figure 1:
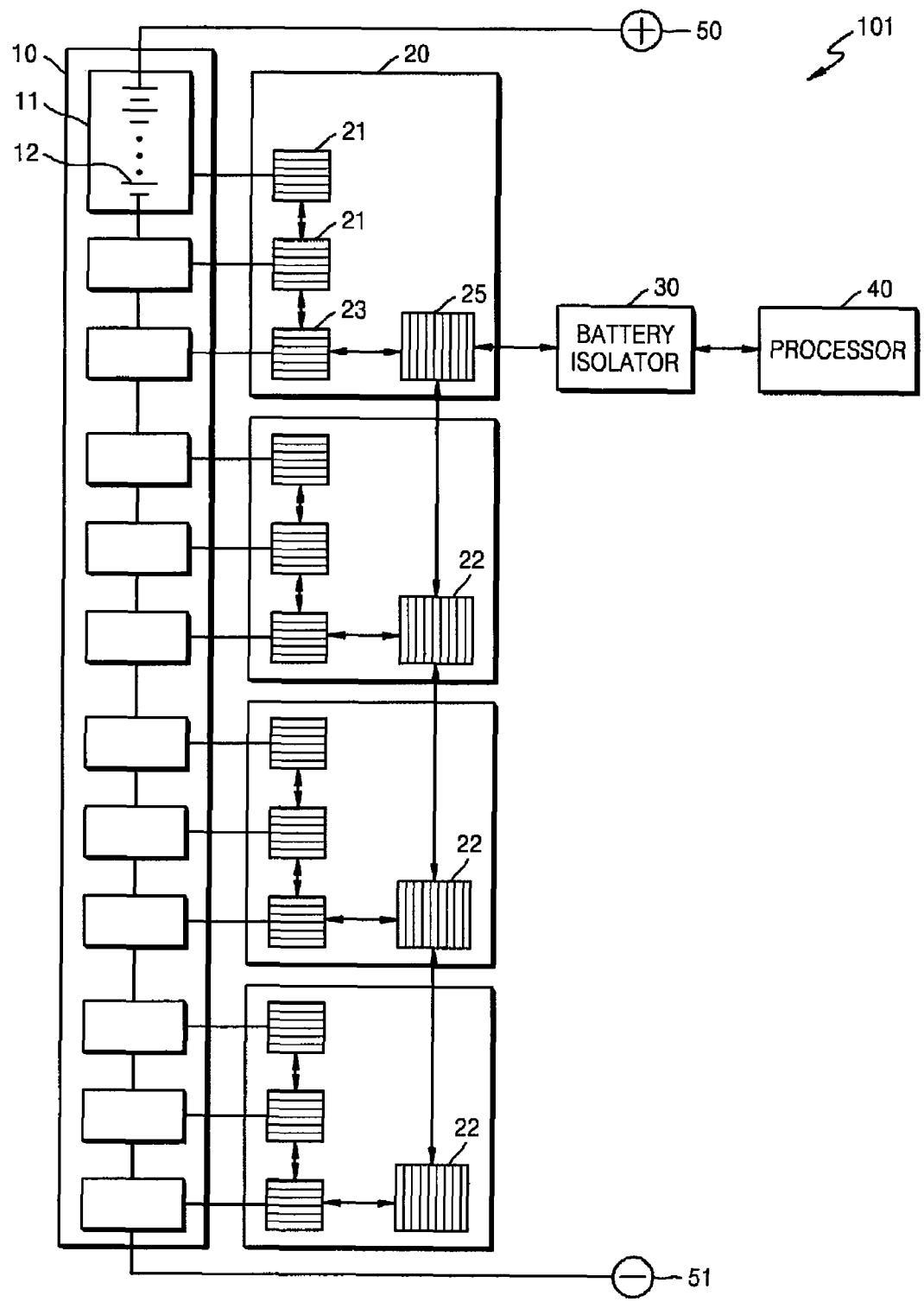
FIG. 1 is a diagram illustrating a battery system, according to an embodiment.

Various inventive aspects, features, and concepts are described more fully with reference to the accompanying drawings, in which exemplary embodiments are shown. The various aspects, features and concepts may, however, be embodied in many different forms by one of ordinary skill in the art. It will be understood that the inventive features are not limited to the embodiments described in the present description. In the description, the detailed descriptions of well-known functions and structures may be omitted so as not to hinder the understanding. Like reference numerals in the drawings generally denote like elements, and in some cases, repeated descriptions of certain aspects will be omitted.

FIG. 1 is a diagram illustrating a battery system 101, according to an embodiment. Referring to FIG. 1, the battery system 101 includes a battery 10, a plurality of measuring units 20, a first isolator 30, and a processor 40.

The battery 10 stores power which is delivered via an external source. A charging operation stores power, and the stored power is delivered to a load during a discharging process. In the battery 10, a positive electrode is connected to a positive terminal 50, a negative electrode is connected to a negative terminal 51, and charging and discharging are performed through the positive terminal 50 and the negative terminal 51.

The battery 10 may include a plurality of battery modules 11 connected to one another in series, in parallel, or with a combination of series and parallel connections. Each of the battery modules 11 may include at least one battery cell 12. When a plurality of battery cells 12 are included in a battery module 11, the battery cells 12 may be connected to one another in series and/or in parallel. Each battery cell 12 is a rechargeable secondary battery. As discussed herein, the battery modules 11 and the battery cells 12 are connected to one another in series, but the present invention is not limited thereto.

Each measuring unit 20 monitors one or more characteristics of the battery cells 12 included in the battery module 11 to obtain data of the battery cells 12. The measuring unit 20 measures, for example, voltages, charging states, and temperatures of the battery cells 12. The measuring unit 20 includes a plurality of first analog front ends (hereinafter, referred to as AFE) 21 and a second AFE 22. The measuring unit 20 may include the plurality of first AFEs 21 and the second AFE 22 on a single circuit board.

The first AFE 21 is connected to one or more battery modules 11 and monitors various states of the battery cells 12 in the battery module 11. The first AFE 21 may, for example, obtain periodically or aperiodically measured values during monitoring of the battery cells 12. However, the method of obtaining data is not limited. For example, the first AFE 21 may obtain a value measured according to a control signal applied from the second AFE 22 or the processor 40.

Each particular first AFE 21 communicates results of the monitoring, that is, the obtained data, to its series connected neighbor first AFE 21. Also, once the next first AFE 21 receives data from the particular first AFE 21, the next AFE 21 sends the received data and data obtained by the next first AFE 21 to a following first AFE 21. The first AFE 21 at the end of the series of first AFEs 21, that is, a main first AFE 23, receives all data obtained by any of the first AFEs 21 in the measuring unit.

In the embodiment of FIG. 1, the battery cells 12 are connected to one another in series, and thus a potential difference increases with distance from a standard battery cell 12 that sets a reference level or ground. The battery cell 12 disposed at a lower side of the battery module 11, may be the standard battery cell 12. In this embodiment, the first AFEs 21 send the obtained data in a direction from a high potential to a low potential, and the first AFE 21, acting as the main first AFE 23 and connected to the lower potential battery cells 12, collects all the obtained data. The main first AFE 23 sends all the received data and data obtained by the main first AFE 23 to the second AFE 22. In other words, all the data obtained from the single measuring unit 20 is collected in the main first AFE 23 and is then sent to the second AFE 22.

Each second AFE 22 receives data obtained by the plurality of first AFEs 21 from one of the main first AFEs 23. Also, the second AFE 22 may receive data collected in another second AFE 22 and send the data received from another second AFE 22 and the data collected from one of the first AFEs 21 to another second AFE 22.

In some embodiments, the plurality of measuring units 20 are connected to one another in series in order to measure states of the battery cells 12. The second AFE 22 included in the measuring unit 20 of the lowest potential, that is, the lowermost measuring unit 20, sends collected data to the second AFE 22 included in the next measuring unit 20. In this regard, the next measuring unit 20 refers to the measuring unit 20 of a potential higher than that of the previous measuring unit 20. The main second AFE 25, that is, the second AFE 22 which collects data of all the battery cells 12 included in the battery 10. The main second AFE 25 sends the collected data to the first isolator 30.

In some embodiments, a potential of a negative electrode of the lowermost battery cell 12 from among the battery cells 12 connected to the last first AFE 21 included in the first measuring unit 20 may be a standard potential (e.g. a ground potential). The first AFEs 21 disposed above the first AFE 21 connected to the standard battery cell 12 measure data with respect to a positive voltage, and the first AFEs 21 disposed below the first AFE 21 connected to the standard battery cell 12 measure data with respect to a negative voltage.

The first isolator 30 includes a data transmission path between the main second AFE 25 and the processor 40. The first isolator 30 separates and insulates grounds of the measuring units 20 and the processor 40 from each other. The first isolator 30 may be any of various circuits, for example, a level shift circuit or an optical isolator.

The processor 40 controls charging and discharging operations of the battery 10 by using data of the battery cell 12 received via the first isolator 30.

A maximum tolerance voltage of the first isolator 30 is determined according to a configuration of the battery system 101. In the current embodiment, as discussed above, the second AFEs 22 sequentially send collected data in a direction from a low potential to a high potential. The main second AFE 25 that is electrically connected to the standard battery cell 12 sends and receives data to and from the first isolator 30. In this embodiment, a voltage corresponding to a potential difference of the battery modules 11 corresponding to three measuring units 20 is applied to the first isolator 30, and thus the first isolator 30 tolerates a voltage having a level that is the total voltage of the battery system. For example, if the single battery cell 12 has a voltage of about 4V and ten battery cells 12 are connected to the single battery module 11 in series, each battery module has a voltage of 40V. Because there are three battery modules for each of three measuring units 20 below the first measuring unit 20, the first isolator 30 of the current embodiment tolerates a voltage of about 360V.

As described above, the ground potential of the main second AFE 25 or the first isolator 30 is a potential of a negative electrode of the lowermost battery cell 12 of the plurality of battery cells 12 included in the battery module 11 connected to the main first AFE 23 of the first measuring unit 20. Voltages applied to the main second AFE 25 and the first isolator 30 respectively have a magnitude of 120V (40V×3), that is the sum of voltages of the battery modules 11 of the first measuring unit 20 and a magnitude of −360V (−120V×3), that is the sum of voltages of the battery modules 11 of the measuring units 20 disposed below the first measuring unit 20. Accordingly, the main second AFE 25 and the first isolator 30 tolerate voltages of about 360V.

Hereinafter, in the embodiments discussed, an output voltage of each battery cell 12 is about 4V and an output voltage of each battery module 11 is about 40V. However, the present invention is not limited thereto, and output voltages of the battery cell 11 and the battery module 12 may vary.

In some embodiments, the obtained data is sent to the second AFE 22 included in the measuring unit 20 disposed at the lowest potential, that is, the lowermost measuring unit 20 includes the main second AFE 25. A ground potential of the first isolator 30 is a potential of a negative electrode of the lowermost battery cell 12. Accordingly, if the first isolator 30 receives data from the second AFE 22 of the lowest potential, the first isolator 30 needs to tolerate a voltage corresponding to a potential difference of the battery modules 11 corresponding to four measuring units 20. That is, the first isolator 30 needs to tolerate a voltage of more than about 480V. However, as a tolerated voltage required in a certain element or circuit is increased, it becomes more difficult and expensive to manufacture the element or the circuit. Also, the increase in manufacturing costs of the element or the circuit is not proportional to an increase in the tolerated voltage required in the element or the circuit, and as the tolerated voltage increases, the manufacturing cost increases significantly.

As described above, according to the battery system 101 of the current embodiment, when data obtained from the battery cells 12 is sent to the processor 40, a maximum voltage of an isolator may be decreased by connecting the main second AFE 25 of a first AFE 21 which is connected to neither the highest or lowest voltage battery module 11.

Figure 2:
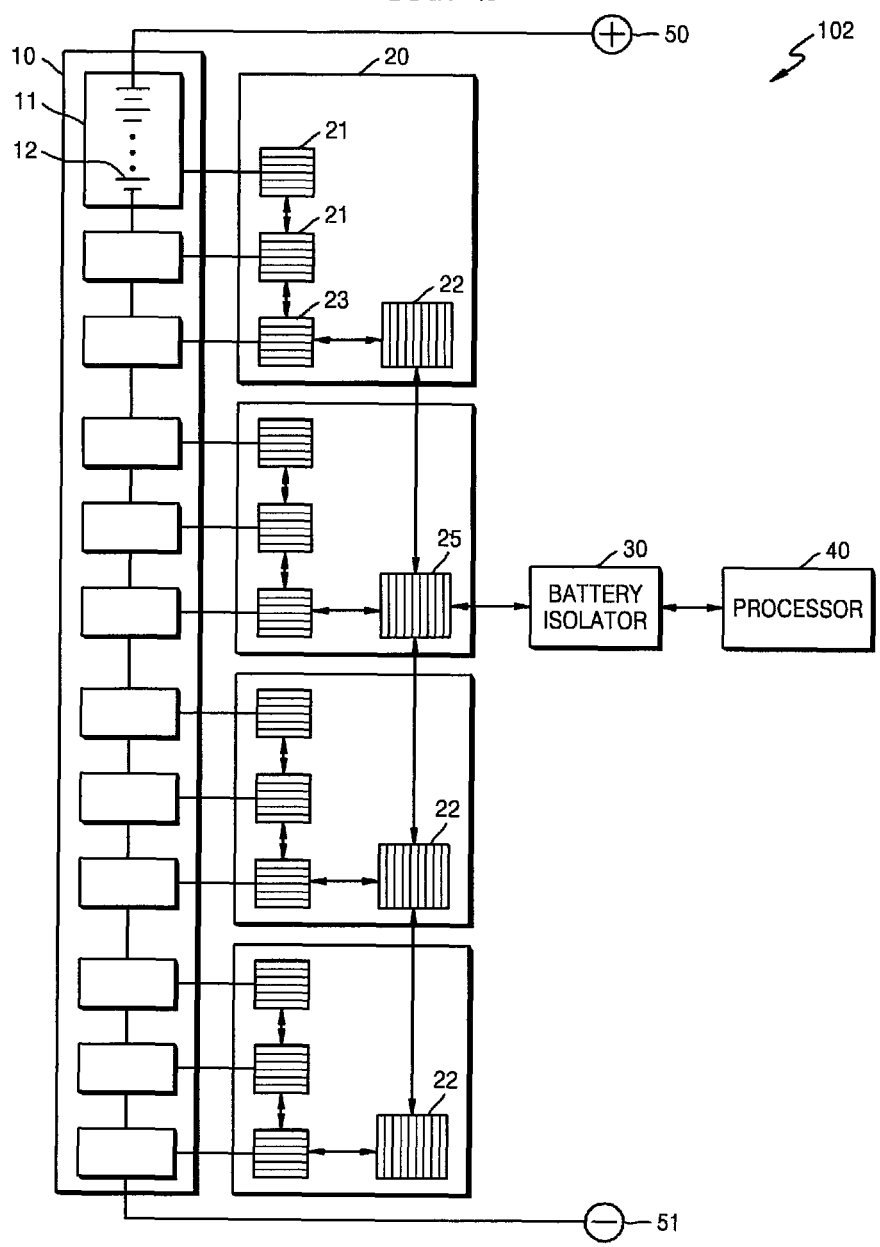
FIG. 2 is a diagram illustrating a battery system, according to another embodiment.

FIG. 2 is a diagram illustrating a battery system 102, according to another embodiment. Referring to FIG. 2, the battery system 102 includes a battery 10, a plurality of measuring units 20, a first isolator 30, and a processor 40. The battery system 102 of the current embodiment has a similar configuration and function as the battery system 101 of FIG. 1.

Each second AFE 22 receives data obtained by a plurality of first AFEs 21 from a main first AFE 23. Also, each second AFE 22 may receive data collected in another second AFE 22 and send the data received from the other second AFE 22 to another second AFE 22.

In the battery system 102 according to the current embodiment, the plurality of measuring units 20 are connected to one another in series, the main second AFE 25 is a second AFE 22 included in the second measuring unit 20 from a high potential side. Accordingly, a negative electrode of the battery cell 12 electrically connected to the last first AFE 21 included in the second measuring unit 20 is a standard (ground) level. Accordingly, the second AFE 22 in the highest potential measuring unit 20 sends collected data to the main second AFE 25. Also, the second AFEs 22 in measuring units of potential lower than that of the main second AFE 25 send collected data in a direction from a low potential to a high potential.

As described above, a required maximum tolerance voltage of the first isolator 30 is determined according to the configuration of the battery system 102. In the current embodiment, the main second AFE 25, that is, the second AFE 22 included in the second measuring unit 20 from the high potential side is connected to, and sends and receives data to the first isolator 40. Because of the position of the main second AFE 25 for sending data, a voltage corresponding to a potential difference of battery modules 11 corresponding to two measuring units 20 is applied to the first isolator 30, and thus the first isolator 30 has a required maximum tolerance voltage having a level that is the same as the voltage of the two measuring units 20. For example, the first isolator 30 of the current embodiment may have a required maximum tolerance voltage having a level that is about 240V.

As described above, according to the battery system 102 of the current embodiment, when data obtained from battery cells 12 is sent to the processor 40, the second AFE 22 disposed in an intermediate potential is used as the main second AFE 25 for sending data to the first isolator 30, thereby decreasing a required maximum tolerance voltage of the first isolator 30.

Figure 3:
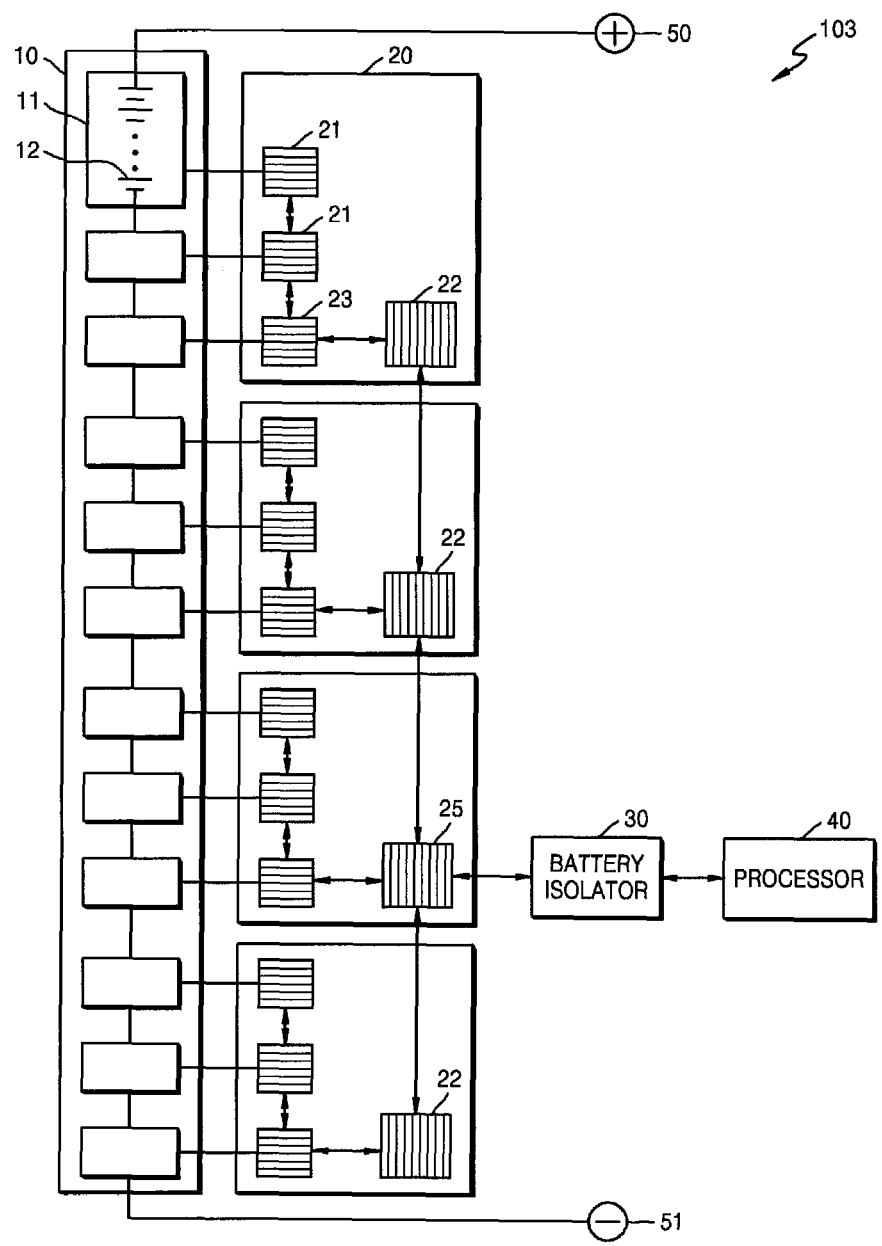
FIG. 3 is a diagram illustrating a battery system, according to yet another embodiment.

FIG. 3 is a diagram illustrating a battery system 103, according to another embodiment. Referring to FIG. 3, the battery system 103 includes a battery 10, a plurality of measuring units 20, a first isolator 30, and a processor 40. The battery system 103 of the current embodiment has a similar configuration and function as the battery system 101 of FIG. 1.

Each second AFE 22 receives data obtained by a plurality of first AFEs 21 from a main first AFE 23. Also, each second AFE 22 may receive data collected in another second AFE 22 and send the data received from the other second AFE 22 to another second AFE 22.

In the battery system 103 according to the current embodiment, the plurality of measuring units 20 are connected to one another in series, the main second AFE 25 is a second AFE 22 included in the second measuring unit 20 from a low potential side. Accordingly, the second AFE 22 of a lowest potential sends the collected data to the main second AFE 25. Also, the second AFEs 22 of a potential higher than that of the main second AFE 25 sequentially send the collected data in a direction from a high potential to a low potential. The main second AFE 25 becomes a standard (ground) level.

As described above, according to the battery system 102 of the current embodiment, when data obtained from battery cells 12 is sent to the processor 40, the second AFE 22 disposed in an intermediate potential is used as the main second AFE 25 for sending data to the first isolator 30, thereby decreasing a required maximum tolerance voltage of the first isolator 30.

As described above, a required maximum tolerance voltage of the first isolator 30 is determined according to the configuration of the battery system 103. In the current embodiment, the main second AFE 25, that is, the second AFE 22 included in the second measuring unit 20 from the low potential side is connected to, and sends and receives data to the first isolator 40. Because of the position of the main second AFE 25 for sending data, a voltage corresponding to a potential difference of battery modules 11 corresponding to at most three measuring units 20 is applied to the first isolator 30, and thus the first isolator 30 has a required maximum tolerance voltage having a level that is the same as the voltage of the three measuring units 20. For example, the first isolator 30 of the current embodiment may have a withstand voltage having a level that is the same as about 360V.

As described above, according to the battery system 103 of the current embodiment, when data obtained from battery cells 12 is sent to the processor 40, the second AFE 22 disposed in an intermediate potential is used as the main second AFE 25 for sending data to the first isolator 30, thereby decreasing the required maximum tolerance voltage of the first isolator 30.

Figure 4:
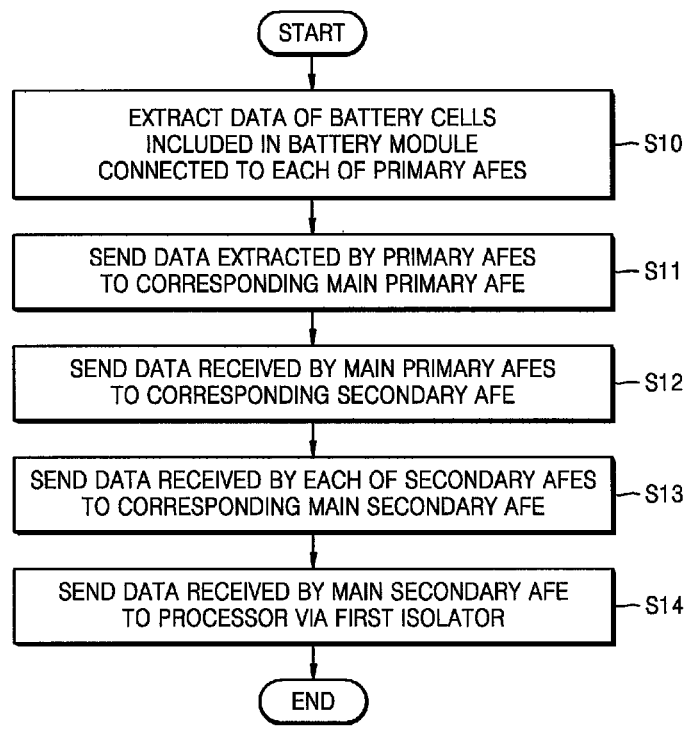
FIG. 4 is a flowchart illustrating a method of controlling a battery system, according to an embodiment.

FIG. 4 is a flowchart illustrating a method of controlling the battery systems 101 through 103, according to an embodiment. Referring to FIG. 4, data of the battery cells 12 included in the battery module 11 connected to each of the plurality of first AFEs 21 is obtained (S10). Each first AFE 21 sends the obtained data to the main first AFE 23 included in the same measuring unit 20 (S11).

The main first AFEs 23 that have received data and have collected obtained data send the collected data to the corresponding second AFE 22 (S12). Each second AFE 22 having received data sends the received data to the main second AFE 25 (S13). The main second AFE 25 may be a second AFE 22 other than the second AFEs 22 included in the measuring unit 20 of a lowest potential. The main second AFE 25 sends received information to the first isolator 30 (S14), and the isolator 30 sends the information to the processor 40 (S15). In some embodiments, the method is repeated with a predetermined frequency, or at times determined by the processor 40.

As described above, according to the battery systems 101 through 103, when data obtained from the battery cells 12 is sent to the processor 40, the required maximum voltage tolerance of the first isolator 30 is decreased by appropriate selection of a position of the main second AFE 25 for sending data to the first isolator 30.

In the embodiments of FIGS. 1 through 4, the second AFE 22 included in each measuring unit 20 receives data from the main first AFE 23 at the lowermost potential among the plurality of first AFEs 21, but the present invention is not limited thereto. That is, the second AFE 22 included in each measuring unit 20 may receive data from the first AFE 21 disposed at, for example, the uppermost potential or another potential first AFE 21.

Also, a position of the first AFE 21 connected to the second AFE 22 may vary among the measuring units 20. For example, the lowermost first AFE 21 may be the main first AFE 23 in the uppermost measuring unit 20, and the uppermost first AFE 21 may be the main first AFE 23 in other measuring units 20.

In the embodiment illustrated in FIG. 1, when the uppermost first AFE 21 is the main first AFE 23 in the uppermost measuring unit 20, the required maximum tolerance voltage of the first isolator 30 is not reduced. Accordingly, in the embodiment illustrated in FIG. 1, a first AFEs 21 other than the uppermost first AFE 21, is used the main first AFE 23 in the uppermost measuring unit 20.

In addition, although not shown, when any of the first AFEs 21, except for the lowermost first AFE 21, is set as the main first AFE 23 in the lowermost measuring unit 20, the first isolator 30 may receive data from the second AFE 22 included in the lowermost measuring unit 20.

Figure 5:
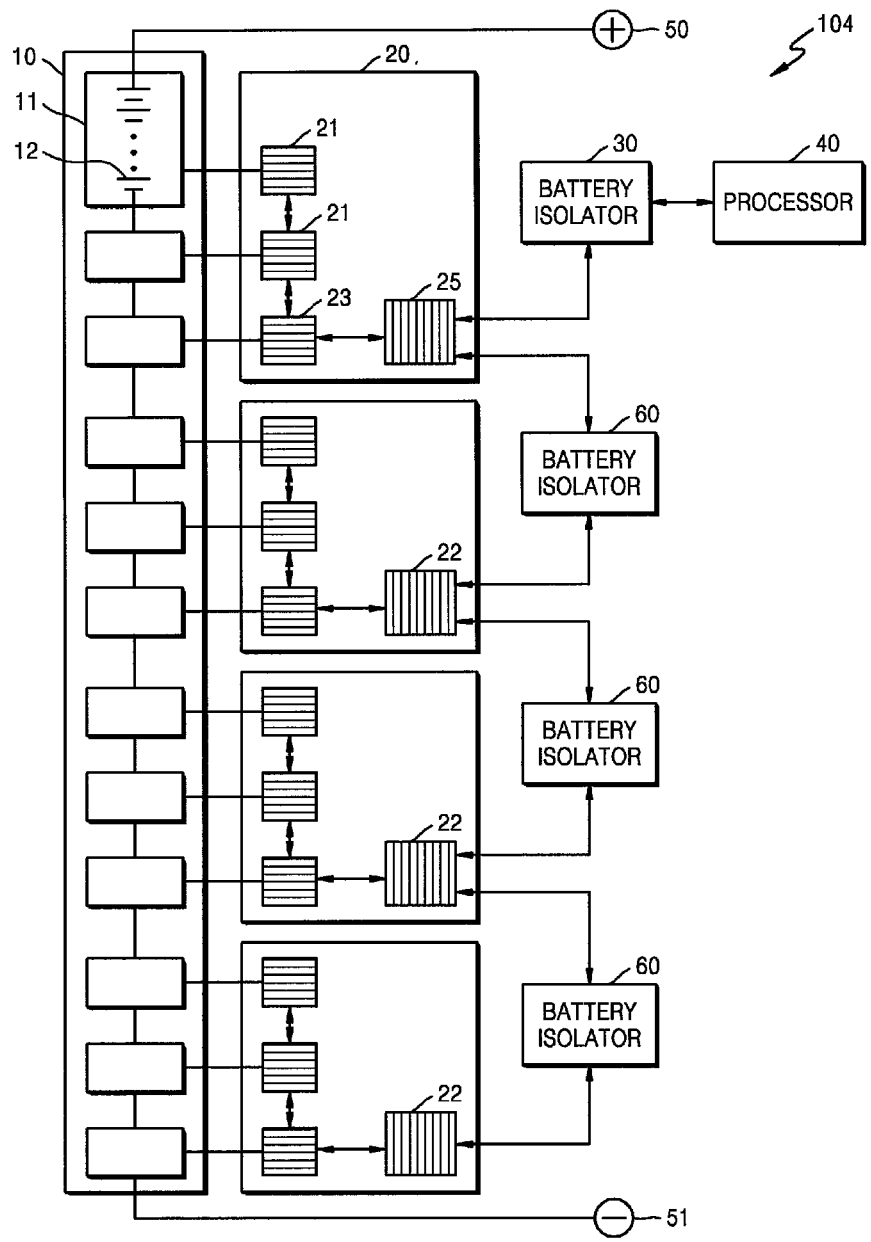
FIG. 5 is a diagram illustrating a battery system, according to another embodiment.

FIG. 5 is a diagram illustrating a battery system 104, according to another embodiment. Referring to FIG. 5, the battery system 104 includes a battery 10, a plurality of measuring units 20, a first isolator 30, a processor 40, and a plurality of second isolators 60. The battery system 104 of the current embodiment has substantially the same configuration and function as the battery system 101 of FIG. 1.

A second AFE 22 receives data obtained by a plurality of first AFEs 21 from a main first AFE 23. Also, the second AFE 22 receives data collected in another second AFE 22 or sends data received from another second AFE 22 or data collected from the first AFE 21 of the measuring unit 20 including the second AFE 22 to another second AFE 22.

In addition, in the battery system 104 of the current embodiment, sending and receiving of data between the plurality of second AFEs 22 are performed through the second isolators 60. That is, the second isolators 60 provide a data transmission path between the second AFEs 22. The second isolators 60 separate and insulate grounds between the measuring units 20. The second isolators 60 may be any of various circuits, for example, a level shift circuit or an optical isolator.

The required maximum tolerance voltages of the first isolator 30 and the second isolator 60 are determined according to a configuration of the battery system 104. In the current embodiment, data is sent between the second AFEs 22 through the second isolators 60, and thus each second isolator 60 may have a required maximum tolerance voltage of about 120V. Also, the main second AFE 25 receives data from a plurality of other second AFEs 22 through the second isolators 60, and thus the first isolator 30 may also have a required maximum tolerance voltage of about 120V.

According to the battery system 104 of the current embodiment, when data obtained from the battery cells 12 is sent to the processor 40, the battery system 104 is configured to send the obtained data between the second AFEs 22 through the second isolators 60, thereby decreasing the required maximum tolerance voltages of the first isolator 30 and the second isolator 60. Also, as described above, manufacturing cost of an element or a circuit is not proportional to an increase in the required maximum tolerance voltage required in the element or the circuit, and as the amount of required maximum tolerance voltage is increased, the manufacturing cost is increased significantly. Thus, according to the battery system 104 of the current embodiment, although the number of isolators is increased, the manufacturing cost may be reduced.

Figure 6:
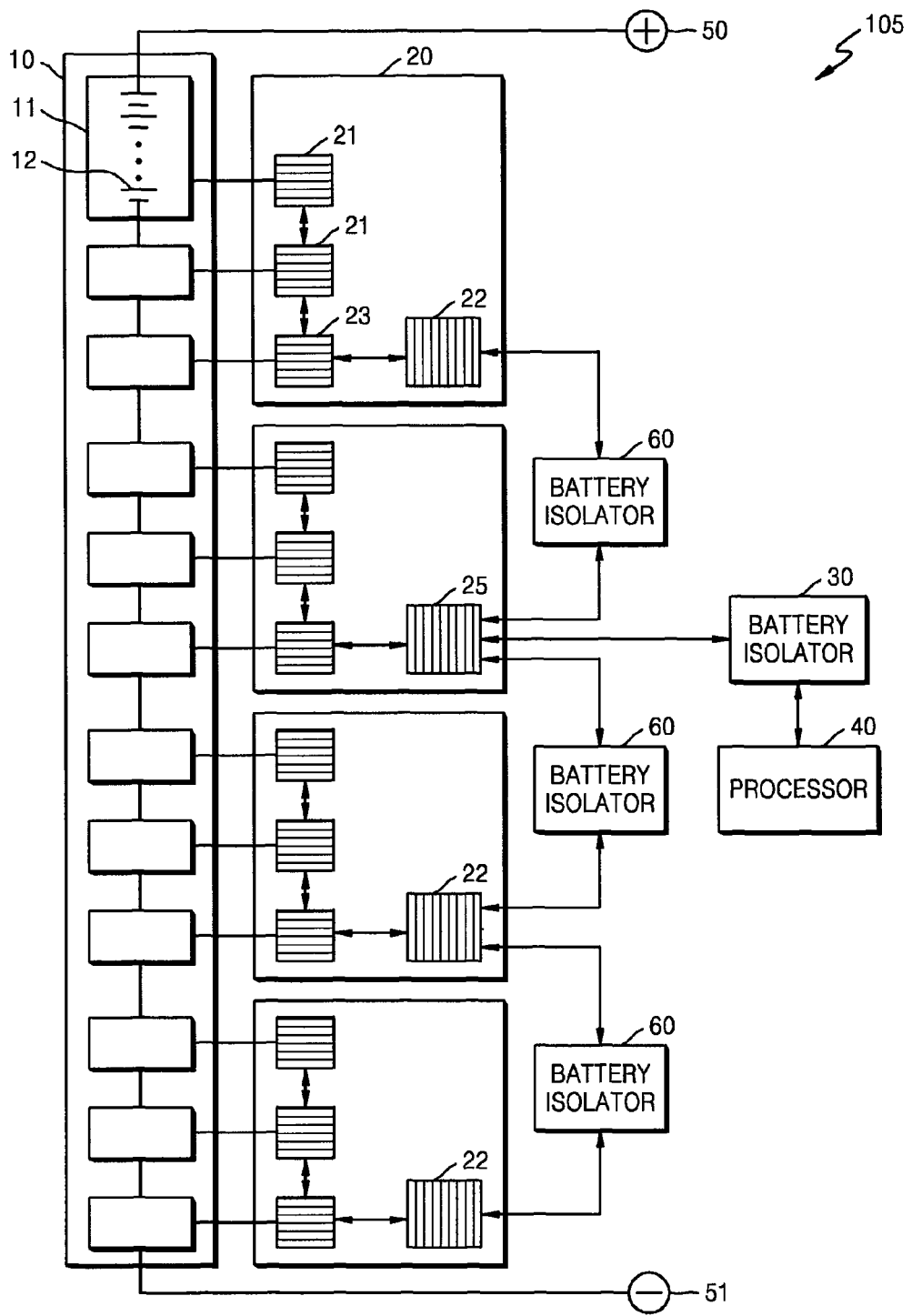
FIG. 6 is a diagram illustrating a battery system, according to yet another embodiment.
Figure 7:
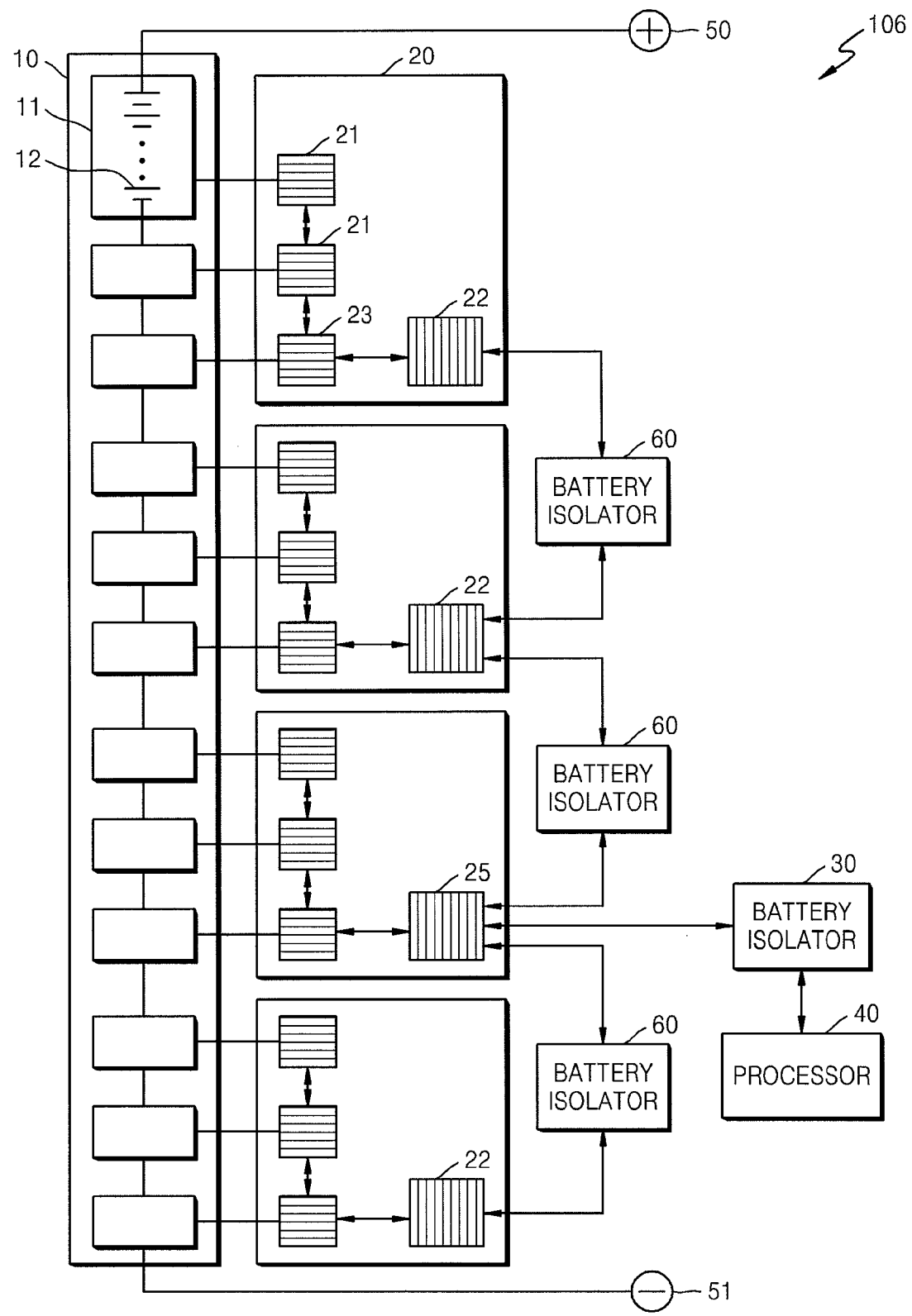
FIG. 7 is a diagram illustrating a battery system, according to still another embodiment.

FIGS. 6 and 7 are diagrams respectively illustrating battery systems 105 and 106, according to other embodiments. Referring to FIGS. 6 and 7, the battery systems 105 and 106 are different from the battery system 104 of FIG. 5 in that a main second AFE 25 connected to a first isolator 30 is in a different location. The systems 105 and 106 otherwise have similar configuration and function as the battery system 104 of FIG. 5.

Figure 8:
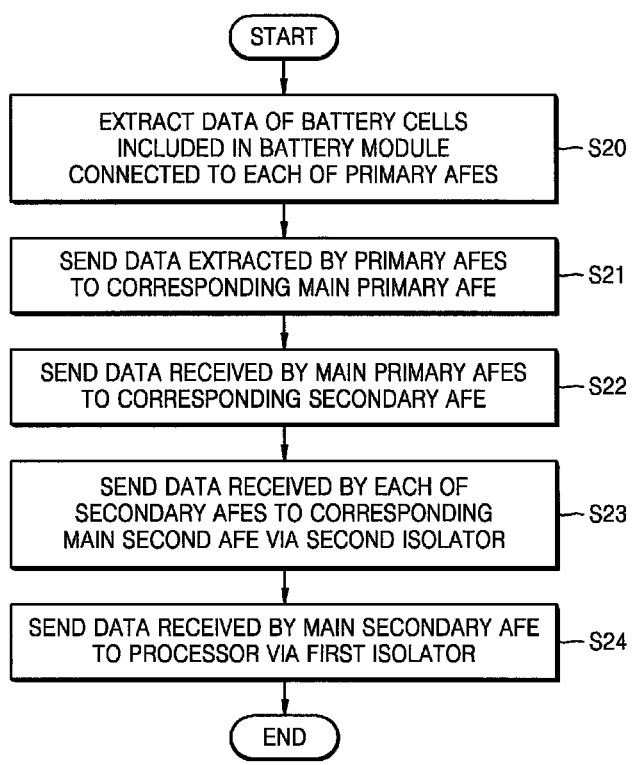
FIG. 8 is a flowchart illustrating a method of controlling a battery system, according to another embodiment.

FIG. 8 is a flowchart illustrating a method of controlling the battery systems 104 through 106. Referring to FIG. 8, data of the battery cells 12 included in the battery module 11 connected to each of the plurality of first AFEs 21 is obtained (S20). Each first AFE 21 sends the obtained data to the main first AFE 23 included in the measuring unit 20 (S21).

The main first AFEs 23, which have received data and have collected data, send the received and collected data to the corresponding second AFE 22 (S22). Each second AFE 22 having received data sends the received data to the main second AFE 25 through the second isolators 60 (S23). The main second AFE 25 may be a second AFE 22 of a measuring unit 20 other than the measuring unit 20 of a lowest or highest potential.

The main second AFE 25 sends received information via the first isolator 30 to the processor 40 (S24). As described above, according to the battery systems 104 through 106 of the current embodiment, when data obtained from the battery cells 12 is sent to the processor 40, required maximum tolerance voltages of the first isolator 30 and the second isolators 60 may be decreased by configuring the battery systems 104 through 106 to send data between the second AFEs 22 through the second isolators 60. Also, as described above, an increase in a manufacturing cost of an element or a circuit is not proportional to an increase in a required maximum tolerance voltage for the element or the circuit, and as the amount of required maximum tolerance voltage is increased, a manufacturing cost is increased significantly. Thus, according to the battery systems 104 through 106, although a number of isolators is increased, the manufacturing cost may be reduced.

Meanwhile, in FIGS. 5 through 8, the second AFE 22 included in each measuring unit 20 receives data from the main first AFE 23 at the lowermost potential from among the plurality of first AFEs 21, but the present invention is not limited thereto. That is, the second AFE 22 included in each measuring unit 20 may, for example, receive data from the first AFE 21 disposed at the uppermost potential or another potential.

Also, the position of the first AFE 21 connected to the second AFE 22 may vary for each measuring unit 20. That is, for example, the lowermost first AFE 21 may be used as the main first AFE 23 in the uppermost measuring unit 20, and the uppermost first AFE 21 may be used as the main first AFE 23 in other measuring units 20.

In addition, although not shown, in the embodiments illustrated in FIGS. 5 through 8, the second isolators 60 are disposed between the measuring units 20, and thus the second isolators 60 may receive data from the second AFE 22 included in the lowermost measuring unit 20.

Figure 9:
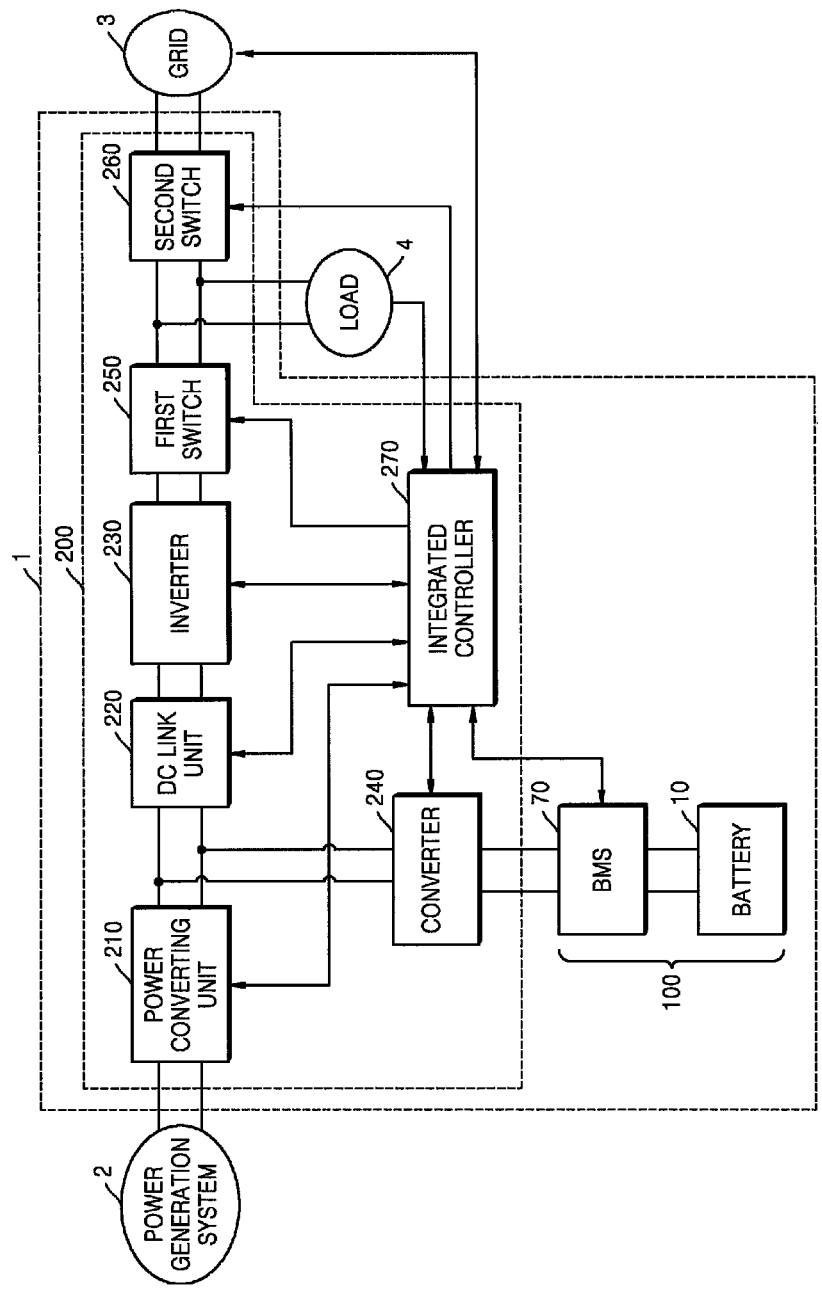
FIG. 9 is a view illustrating an energy storage system, according to an embodiment.

FIG. 9 is a diagram illustrating an energy storage system 1 according to an embodiment. Referring to FIG. 9, the energy storage system 1 of the current embodiment supplies power from a power generation system 2 and a grid 3 to a load 4.

The power generation system 2 is a system for generating power by using an energy source. The power generation system 2 supplies the generated power to the energy storage system 1. The power generation system 2 may be, for example, a photovoltaic system, a wind power generation system, a tidal power generation system, or the like, but the present invention is not limited thereto. The power generation system 2 may be any power generation system for generating power by using a renewable energy such as solar heat or geothermal heat.

The grid 3 includes a power plant, a substation, a power line, and the like. When the grid 3 is in a normal state, the grid 3 supplies power to the energy storage system 1 so as to supply power to the load 4 and/or a battery 10. The grid 3 also receives power from the energy storage system 1. When the grid 3 is in an abnormal state, power is stopped from being supplied from the grid 3 to the energy storage system 1, and power is also stopped from being supplied from the energy storage system 1 to the grid 3.

The load 4 consumes power generated by the power generation system 2, power stored in a battery 10, and power supplied from the grid 3. The load 4 may be, for example, a home, a plant, or the like.

The energy storage system 1 may store power generated by the power generation system 2 in the battery 10 and supply the power to the grid 3. The energy storage system 1 may supply power stored in the battery 10 to the grid 2 or store power supplied from the grid 3 in the battery 10. When the grid 3 is in an abnormal state, for example, when a power failure occurs in the grid 3, the energy storage system 1 may also perform an uninterruptible power supply (UPS) operation so as to supply power to the load 4. The energy storage system 1 may also supply power generated by the power generation system 2 or power stored in the battery 10 to the load 4 when the grid 3 is in a normal state.

The energy storage system 1 includes a power conversion system (hereinafter, referred to as a PCS) 200, a battery management system (hereinafter, referred to as a BMS) 70, and the battery 10.

The PCS 200 converts power of the power generation system 2, the grid 3, and the battery 10 into appropriate power and supplies the converted power to where it is required. The PCS 200 in this embodiment includes a power converting unit 210, a direct current (DC) link unit 220, a inverter 230, a converter 240, a first switch 250, a second switch 260, and an integrated controller 270. Other PCSs may be used.

The power converting unit 210 is connected between the power generation system 2 and the DC link unit 220. The power converting unit 210 delivers power generated by the power generation system 2 to the DC link unit 220, and, the power converting unit 210 converts an output voltage into a DC link voltage. In particular, when the power generation system 2 generates power by using solar light, the power converting unit 210 may include a maximum power point tracking (MPPT) converter for performing MPPT control so as to maximize the amount of power generated by the power generation system 2 according to a change in the amount of sun light or temperature.

The DC link voltage may be unstable due to a sudden voltage drop in the power generation system 2 or the grid 3 or generation of a peak load in the load 4. However, the DC link voltage may need to be stable for normal operations of the converter 240 and the inverter 230. The DC link unit 220 may include, for example, a large-value capacitor for stabilization of the DC link voltage, and is connected between the power converting unit 210 and the inverter 230 so as to maintain the DC link voltage.

The inverter 230 is a power converter connected between the DC link unit 220 and the first switch 250. The inverter 230 may include an inverter that converts the DC link voltage output from the power generation system 2 and/or the battery 10 into an alternating current (AC) voltage of the grid 2 in a discharging mode and outputs the AC voltage. Also, the inverter 230 may include a rectifying circuit that rectifies an AC voltage supplied by the grid 3 into a DC link voltage and outputs the DC link voltage in order to store power supplied from the grid 3 in the battery 10 in a charging mode. The inverter 230 may be a bi-directional inverter or may include plurality of inverting circuits.

The inverter 230 may include a filter for removing higher harmonics from an AC voltage to be output to the grid 3, and a phase locked loop (PLL) circuit for synchronizing a phase of an AC voltage output from the inverter 230 and a phase of an AC voltage of the grid 3. Also, the inverter 230 may perform functions such as voltage change range restriction, power-factor improvement, elimination of a DC component, protection against a transient phenomena, and the like.

The converter 240 is a power converter connected between the DC link unit 220 and the battery 10. The converter 240 includes a converter for DC-DC converting power stored in the battery 10 into power having a voltage level required by the inverter 230, that is, a DC link voltage, and outputting the DC link voltage in a discharging mode. The converter 240 includes a converter for DC-DC converting power output from the power converting unit 210 or power output from the inverter 230 into power having a voltage level required by the battery 10, that is, a charging voltage, in a charging mode. The converter 240 may be a bi-directional converter or may include plurality of converting circuits.

The first switch 250 and the second switch 260 are connected to each other in series between the inverter 230 and the grid 3, and control current flow between the power generation system 2 and the grid 3 by performing ON/OFF operations under the control of the integrated controller 270. The ON/OFF operations of the first switch 250 and the second switch 260 may be performed according to states of the power generation system 2, the grid 3, and the battery 10. For example, when a large amount of power is required in the load 4, the first switch 250 and the second switch 260 are turned on so as to supply power of the power generation system 2, the grid 3, and the battery 10 to the load 4. On the other hand, when a power failure occurs in the grid 3, the second switch 260 is turned off and the first switch 250 is turned on. Thus, power output from the power generation system 2 or the battery 10 may be supplied to the load 4, and accidents such as a worker being shocked by a power line of the grid 3 may be prevented by preventing power supplied to the load 4 from flowing to the grid 3.

The integrated controller 270 monitors states of the power generation system 2, the grid 3, the battery 10, and the load 4 and controls the power converting unit 210, the inverter 230, the converter 240, the first switch 250, the second switch 260, and the BMS 70 according to a result of the monitoring. The integrated controller 270 may monitor whether a power failure occurs in the grid 3 and whether power is being generated by the power generation system 2. In addition, the integrated controller 270 may monitor an amount of power generated by the power generation system 2, a charging state of the battery 10, an amount of power consumed in the load 4, a time, and the like.

The BMS 70 is connected to the battery 10 and controls charging and discharging operations of the battery 10 under the control of the integrated controller 270. The BMS 70 may perform an overcharging protection function, an overdischarging protection function, an overcurrent protection function, an overvoltage protection function, an overheating protection function, a cell balancing function, and the like in order to protect the battery 10. For this, the BMS 70 may monitor a voltage, a current, a temperature, an amount of power remaining, a lifespan, a charging state, etc., of the battery 10, and may transmit a result of the monitoring to the integrated controller 270.

The battery 10 stores power generated by the power generation system 2 and power of the grid 3 and supplies the stored power to the load 4 or the grid 3. A number of the batteries 10 may be determined according to an amount of power required in the energy storage system 1, design conditions, and the like. For example, when a large amount of power is consumed by the load 4, a plurality of batteries 10 may be included, and when a small amount of power is consumed by the load 4, only a single battery 10 may be included.

Meanwhile, the battery system 100 including the battery 10 and the BMS 70 may be the battery systems 101 through 106 described in FIGS. 1 through 3 and 5 through 7. The BMS 70 may include a plurality of measuring units 20, a first isolator 30, a second isolator 60, a processor 40, and the like.

As described above, in the energy storage system 1 according to the current embodiment, the required maximum tolerance voltages of the first isolator 30 and/or the second isolator 60 included in the battery system 100 may be decreased, thereby reducing an installation cost of the energy storage system 1.

It should be understood that the exemplary embodiments described herein should be considered in a descriptive sense only and not for purposes of limitation. Descriptions of features or aspects within each embodiment should typically be considered as available for other similar features or aspects in other embodiments.

What is claimed is:

1. A battery system, comprising:
   a battery pack comprising a plurality of battery modules, each battery module comprising at least one battery cell; and
   a plurality of measuring units, wherein each measuring unit is connected to at least two of the battery modules, wherein each measuring unit comprises at least two first analog front ends (AFEs) configured to monitor at least one characteristic of the at least two battery modules, wherein each first AFE is configured to transmit information related to the monitored characteristic via an isolator to a processor configured to control the battery pack based on the transmitted information, and wherein the isolator is configured to receive the transmitted information only from an AFE which is not connected to the battery module of the battery modules having the least electric potential or to the battery module of the battery modules having the greatest electric potential.

2. A battery system, comprising:
   a processor;
   a first isolator in data communication with the processor;
   a battery pack comprising a plurality of battery modules, each battery module comprising at least one battery cell; and
   a plurality of measuring units, wherein each measuring unit is connected to more than one of the battery modules, wherein each measuring unit comprises a plurality of first analog front ends (AFEs) configured to monitor at least one characteristic of the connected battery modules, wherein each first AFE is configured to transmit information indicative of the monitored characteristic via the first isolator to the processor,
   wherein the processor is configured to control the battery pack based on the battery characteristic information, and wherein the first isolator is configured to receive the battery characteristic information only from one of the first AFEs which is not connected to any one of the battery modules having the least or greatest electric potential.

3. The battery system of claim 2, wherein each measuring unit comprises:
   a selected first AFE configured to monitor the characteristic of a first one of the battery modules connected to the measuring unit, and
   another selected first AFE configured to monitor the characteristic of a second one of the battery modules connected to the measuring unit,
   wherein the selected first AFE is configured to transmit information related to the monitored characteristic of the first battery module to the other selected first AFE.

4. The battery system of claim 3, wherein the other selected first AFE of each measuring unit is configured to transmit the information to the processor via the first isolator.

5. The battery system of claim 3, wherein each measuring unit further comprises a second AFE connected to an output of the other selected first AFE and connected to a second AFE of another measuring unit, wherein the second AFE of each measuring unit is configured to transmit information indicative of the monitored characteristic of the first and second battery modules to the processor.

6. The battery system of claim 5, wherein the other selected first AFE of each measuring unit is configured to transmit information indicative of the monitored characteristic of the first and second battery modules to the second AFE.

7. The battery system of claim 6, wherein the second AFE of each measuring unit is configured to transmit the information to the processor via the first isolator.

8. The battery system of claim 5, wherein the second AFEs of the measuring units are connected so that a selected second AFE configured to receive the information from the selected other first AFE of a first measuring unit is configured to transmit the information of the first measuring unit to a second AFE of a second measuring unit.

9. The battery system of claim 8, wherein the second AFE of the second measuring unit is configured to transmit the information of the first measuring unit and of the second measuring unit to the processor.

10. The battery system of claim 8, wherein the second AFEs of the measuring units are configured to transmit the information to each other via a second isolator.

11. The battery system of claim 8, wherein the second AFEs of the measuring units are connected so that the second AFE of the second measuring unit is configured to additionally receive information from the second AFE of a third measuring unit.

12. The battery system of claim 11, wherein the second measuring unit is configured to receive the information from the second AFE of the third measuring unit via a data path different from a data path for receiving the information from the second AFEs of the first and second measuring units.

13. The battery system of claim 2, wherein each battery module comprises a plurality of battery cells connected serially.

14. The battery system of claim 3, wherein the other selected first AFE is connected to the battery module of the lowest voltage of the battery module.

15. An energy storage system, comprising:
   a power conversion system configured to be connected to a power source and to a load;
   a battery management system connected to the power conversion system; and
   a battery system connected to the battery management system, the battery system comprising:
   a processor;
   an isolator in data communication with the processor;

a battery pack comprising a plurality of battery modules, each battery module comprising at least one battery cell; and a plurality of measuring units, wherein each measuring unit is connected to more than one of the battery modules, wherein each measuring unit comprises a plurality of first analog front ends (AFEs) configured to monitor at least one characteristic of the connected battery modules, wherein each first AFE is configured to transmit information indicative of the monitored characteristic via the isolator to the processor, wherein the processor is configured to control the battery pack based on the battery characteristic information, and wherein the isolator is configured to receive the battery characteristic information only from one of the first AFEs which is not connected to any one of the battery modules having the least or greatest electric potential.

16. The energy storage system of claim 15, wherein each measuring unit comprises:

a selected first AFE configured to monitor the characteristic of a first one of the battery modules connected to the measuring unit, and another selected first AFE configured to monitor the characteristic of a second one of the battery modules connected to the measuring unit, wherein the selected first AFE is configured to transmit information related to the monitored characteristic of the first battery module to the other selected first AFE.

17. The energy storage system of claim 16, wherein the other selected first AFE of each measuring unit is configured to transmit the information to the processor via the isolator.

18. The energy storage system of claim 16, wherein each measuring unit further comprises a second AFE connected to the other selected first AFE and connected to a second AFE of another measuring unit, wherein the second AFE of each measuring unit is configured to transmit information indicative of the monitored characteristic of the first and second battery modules to the processor.

19. The energy storage system of claim 18, wherein the other selected first AFE of each measuring unit is configured to transmit information indicative of the monitored characteristic of the first and second battery modules to the second AFE.

* * * * *